United States Patent [19]

Okitsu et al.

[11] 4,454,313

[45] Jun. 12, 1984

[54] POLYESTER COMPOUND

[75] Inventors: Kiyoshi Okitsu, Otake; Akira Yamamoto, Tokyo, both of Japan

[73] Assignee: Daicel Chemical Industries, Ltd., Sakai, Japan

[21] Appl. No.: 537,904

[22] Filed: Sep. 30, 1983

[30] Foreign Application Priority Data

Oct. 8, 1982 [JP] Japan .................................. 57-177194

[51] Int. Cl.$^3$ ........................ C08G 63/16; C08G 63/18
[52] U.S. Cl. ..................................... 528/302; 525/448; 525/450; 528/305; 528/370
[58] Field of Search ...................... 528/302, 305, 370; 525/448, 450

[56] References Cited

U.S. PATENT DOCUMENTS

| | | | |
|---|---|---|---|
| 3,502,623 | 3/1970 | Hurworth et al. | 528/296 X |
| 3,972,962 | 8/1976 | Williams et al. | 528/302 X |
| 4,415,728 | 11/1983 | Tremblay | 528/302 X |

*Primary Examiner*—Lucille M. Phynes
*Attorney, Agent, or Firm*—Flynn, Thiel, Boutell & Tanis

[57] ABSTRACT

A polyester compound has an average molecular weight of 700 to 3000 and is modified with epsilon-caprolactone. It is prepared from (a) epsilon-caprolactone or omega-hydroxycaproic acid, (b) an aliphatic diol component, (c) an aromatic or aliphatic polybasic carboxylic component and (d) an aromatic monocarboxyl to terminate each polymer chain.

2 Claims, No Drawings

POLYESTER COMPOUND

The present invention relates to a new polyester compound.

Plasticized vinyl chloride resin products have been used widely for various purposes. Recently, the regulation on the safety of electric wire coatings and automobile parts has been tightened and, therefore, improvement in heat resistance of them has been eagerly demanded. Further, heat resistance is required also of additives used for lowering the crystallization temperature of polyethylene terephthalate resins, since the blending temperature of them is high.

There have been known dialkyl phthalates prepared from monohydric alcohols having 9 to 13 carbon atoms, such as dinonyl phthalate, diisodecyl phthalate and ditridecyl phthalate, having a heat resistance higher than that of di-2-ethylhexyl phthalate (DOP) which is a typical plasticizer. In addition, there have been known also alkyl esters of aromatic tribasic and tetrabasic carboxylic acids prepared from monohydric alcohols having 6 to 10 carbon atoms, such as trihexyl trimellitate, tri-2-ethylhexyl trimellitate, triisodecyl trimellitate and tetra-2-ethylhexyl pyromellitate.

However, the above-mentioned plasticizers have defects that the proportion of the polar groups in the molecule is reduced as the carbon number of the alcohol is increased, whereby the compatibility with a vinyl chloride resin is reduced and processability such as gelling property becomes insufficient. Another defect is that the plasticizer bleeds on the resin surface.

As other plasticizers, there may be mentioned a polyester having a molecular weight of 500 to 10,000 prepared by dehydration condensation of a dibasic carboxylic acid such as adipic acid with a glycol such as propylene glycol or 1,3-butanediol and a polyester obtained by modifying a terminal of the above-mentioned polyester with a fatty acid or an alcohol. However, the processability of the polyester is deteriorated as its molecular weight is increased, though its heat resistance is improved. When the polyester is used in combination with a lead stabilizer mainly used for stabilizing the vinyl chloride resin used as an electric wire coating, the resin cannot exhibit a sufficient insulating property and the polyester bleeds easily under a high humidity condition.

As compared with a polybutylene terephthalate resin, a polyethylene terephthalate resin has an inferior moldability, since the latter has a high crystallization temperature. For using the polyethylene terephthalate resin more widely, the lowering of its crystallization temperature by the use of an additive is now investigated.

As an additive used for this purpose, there has been proposed a polyester having a molecular weight of 500 to 10,000 obtained by dehydration condensation of a dibasic carboxylic acid such as adipic acid with a glycol such as propylene glycol or 1,3-butanediol or a polyester obtained by modifying the terminal of the above-mentioned polyester with a fatty acid or an alcohol. However, since these polyesters must be kneaded with the polyethylene terephthalate at a high temperature, they are thermally decomposed, resulting in deterioration of physical properties such as tensile strength.

After intensive investigations made for the purpose of solving the above-mentioned problems, the inventors have found that a caprolactone-modified polyester can be used as a plasticizer for a vinyl chloride resin or a modifying agent for a polyethylene terephthalate resin, since it has excellent compatibility, heat resistance and workability; said caprolactone-modified polyester being obtained by a ring-opening polymerization reaction of ω-caprolactone with a polyester polyol, prepared from an aliphatic dihydroxyl compound and an aromatic or aliphatic polybasic carboxylic acid, to obtain a polymer having an average molecular weight of 700 to 3,000 followed by termination of the same with an aromatic monocarboxylic acid. The present invention has been completed on the basis of this finding.

The present invention provides a polyester compound represented by the general formula:

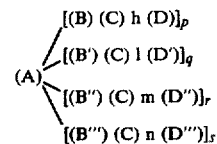

wherein:
(A) is a residue of an aromatic carboxylic acid having 1 to 4 carboxyl groups and 1 or 2 aromatic rings or a residue of an aliphatic carboxylic acid having 1 to 4 carboxyl groups and 4 to 37 carbon atoms,
(B), (B'), (B") and (B'") may be the same or different and each is a residue of a saturated, straight-chain or branched aliphatic diol having 2 to 6 carbon atoms,
(C) is a residue of ω-hydroxycaproic acid and h, l, m and n are numbers larger than 0, and (D), (D'), (D") and (D'") may be the same or different and each is a residue of an aromatic monocarboxylic acid having 1 or 2 aromatic rings, the respective residues being bonded with each other through an ester bond and selected so as to give the average molecular weight of 700 to 3,000 by properly adjusting the values of h, l, m and n. and p, q, r and s are each zero or one, the total of them being from one to four.

The ω-hydroxycaproic acid residue is derived preferably from ε-caprolactone. It is also possible, however, to derive the ω-hydroxycaproic acid residue from the ω-hydroxycaproic acid per se in the course of the preparation of the compound represented by the above general formula.

The present invention provides also a process for producing a polyester compound represented by the general formula:

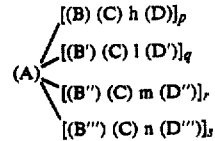

wherein:
(A) is a residue of an aromatic carboxylic acid having 1 to 4 carboxyl groups and 1 or 2 aromatic rings or a residue of an aliphatic carboxylic acid having 1 to 4 carboxyl groups and 4 to 37 carbon atoms,
(B), (B'), (B") and (B'") may be the same or different and each is a residue of a saturated, straight-chain or branched aliphatic diol having 2 to 6 carbon atoms,
(C) is a residue of ω-hydroxycaproic acid and h, l, m and n are numbers larger than 0, and (D), (D'), (D") and (D'") may be the same or different and each is a residue of an aromatic monocarboxylic acid having 1 or 2 aromatic rings, the respective residues being bonded with each other through an ester bond and selected so as to give the average molecular weight to 700 to 3,000 by properly adjusting the values of h, l, m and n, characterized by reacting:

(a) 10 to 90 molar % of ε-caprolactone or ω-hydroxycaproic acid,
(b) a hydroxyl component comprising one or more saturated, straight-chain or branched aliphatic diol having 2 to 6 carbon atoms,
(c) an aromatic polybasic carboxylic acid component having 1 or 2 aromatic rings or an aliphatic polybasic carboxylic acid component having 4 to 37 carbon atoms and
(d) an aromatic monocarboxylic acid having 1 or 2 aromatic rings, in such a manner that the hydroxyl component is used in a stoichiometric amount or up to 20% excess based on the acid components. The total amount of the components (b), (c) and (d) is 90 to 10 molar percent based on the amount of the caprolactone component.

The symbol (A) in the above general formula represents a residue of an aromatic carboxylic acid having 1 to 4 carboxyl groups and 1 or 2 aromatic rings or a residue of an aliphatic carboxylic acid having 1 to 4 carboxyl groups and 4 to 37 carbon atoms. As the aromatic carboxylic acid, there may be mentioned a monobasic carboxylic acid such as benzoic acid or toluic acid; a dibasic carboxylic acid such as phthalic acid, isophthalic acid, terephthalic acid, methylphthalic acid, naphthalene-dicarboxylic acid, tetrachlorophthalic acid or tetrabromophthalic acid; a tribasic carboxylic acid such as trimellitic acid or trimesic acid; a tetrabasic carboxylic acid such as pyromellitic acid or benzophenonetetracarboxylic acid; or an anhydride or ester of the above-mentioned monobasic to tetrabasic carboxylic acids. As the aliphatic carboxylic acid, there may be mentioned a monobasic carboxylic acid such as lauric acid, stearic acid, cyclohexenecarboxylic acid or methylcyclohexenecarboxylic acid; a dibasic carboxylic acid such as adipic acid, azelaic acid, nadic acid, chlorendic acid, tetrahydrophthalic acid, hexahydrophthalic acid, 3-methyltetrahydrophthalic acid or 3-methylhexahydrophthalic acid; a tribasic carboxylic acid such as 1,3-dimethyl-1,2,3-cyclohexanetricarboxylic acid or 1-carboxy-4-methylcyclohexylsuccinic acid; a tetrabasic carboxylic acid such as methylcyclohexenetetracarboxylic acid; or an anhydride or ester of the above-mentioned monobasic to tetrabasic carboxylic acids. From the viewpoint of physical properties, economic advantage and availability of the starting material, it is particularly preferred to use phthalic anhydride, isophthalic acid, acid, terephthalic acid or trimellitic anhydride.

The symbols (B), (B'), (B'') and (B''') in the above general formula represent a residue of a saturated straight-chain or branched aliphatic diol having 2 to 6 carbon atoms and they may be the same or different from one another. As the diol compound, there may be mentioned, for example, ethylene glycol, diethylene glycol, propylene glycol, dipropylene glycol, 1,4-butanediol, 1,3-butanediol, neopentyl glycol or 1,6-hexanediol. Among these compounds, ethylene glycol, diethylene glycol, 1,4-butanediol or neopentyl glycol is used particularly preferably from the viewpoint of physical properties, economic advantage and reaction operationtions.

The symbol (C) in the above general formula represents an ω-hydroxycaproic acid residue. From the viewpoint of the economic advantage and reaction operations, it is preferred to use ε-caprolactone.

The symbols h, l, m and n are values larger than 0. The sum total of h, l, m and n is 0.2 to 30, preferably 0.5 to 20.

The symbols (D), (D'), (D'') and (D''') in the above general formula represent an aromatic monocarboxylic acid residue having 1 or 2 aromatic rings and they may be the same or different from one another. From the viewpoint of physical properties, economic advantage and availability of the starting material, it is preferred to use benzoic acid or toluic acid as the aromatic monocarboxylic acid.

The present invention provides also a process for producing a polyester compound represented by the above general formula which comprises reacting the following components (a) to (d):

(a) 10 to 90 molar % of ε-caprolactone or ω-hydroxycaproic acid,
(b) a hydroxyl component comprising one or more saturated, straight-chain or branched aliphatic diol having 2 to 6 carbon atoms,
(c) an aromatic polybasic carboxylic acid component having 1 or 2 aromatic rings or an aliphatic polybasic carboxylic acid component having 4 to 37 carbon atoms and
(d) an aromatic monocarboxylic acid having 1 or 2 aromatic rings, in such a manner that the hydroxyl component is used in a stoichiometric amount or up to 20% excess based on the acid components and the amount of the lactone and the ratio of the remaining reactants are controlled so that the resulting product will have an average molecular weight of 700 to 3,000.

The polyester represented by the above general formula may be produced by an ordinary process wherein a dihydroxyl compound is reacted with a dicarboxylic acid. In a convenient process, a mixture of the reactants is heated to 100° to 250° C. under such a condition that water formed by the condensation reaction is removed by introducing an inert gas into the heated reaction mixture or by carrying out the reaction in the presence of an adequate inert solvent which forms an azeotropic mixture with the formed water, such as toluene or xylene. Preferably, the reaction is continued until the content of the terminal carboxylic group in the resulting polyester corresponds to an acid value of less than 10 mg, preferably less than 1 mg of potassium hydroxide per gram of the polyester.

If necessary, a catalyst generally used in the production of polyesters may be added to the reaction mixture. The catalyst includes a strong acid such as sulfuric acid, p-toluenesulfonic acid or phosphoric acid; a Lewis acid such as stannic acid; zinc chloride; aluminum chloride; a metal salt and a metal alkoxide or a derivative thereof such as tetrabutyl titanate, zinc adipate, antimony oxide or an organotin compound. The amount of the catalyst used is in the range of 0.0001 to 2 wt.% based on the whole reaction mixture.

When the polyester compound of the present invention is used as a plasticizer for a vinyl chloride resin, an extraction resistance, migration resistance, heat resistance and processability superior to those of a conventional non-migrating plasticizer can be obtained and main defects of this type of the plasticizers can be overcome.

The polyester compound of the present invention may be incorporated in a thermoplastic polymer such as vinyl chloride resin or its copolymer according to a conventional process. If necessary, the thermoplastic composition may contain other additives such as heat stabilizer, light stabilizer, antioxidant, filler, pigment, lubricant and processing aid as well as other plasticizers.

As the heat stabilizer and light stabilizer, the following substances may be mentioned:

(1) an inorganic or organic acid salt containing any metal having an effect of stabilizing the vinyl chloride resin; the metal including, for example, aluminum, barium, bismuth, calcium, cadmium, potassium, lithium, magnesium, sodium, lead, antimony, tin, strontium and zinc, per se or its salt. The salt may be either a single salt or a complex salt.

The inorganic salt is, for example, basic lead carbonate or tribasic lead sulfate. The organic acid used is as follows:

(a) a straight-chain or branched, saturated or unsaturated, aliphatic carboxylic acid which may have a hydroxyl substituent or oxygen atom in the epoxy group, such as zinc 2-ethylhexanoate, barium laurate or stannous octanoate, (b) an aromatic mono- or dicarboxylic acid having any type of substituent in its aromatic group and any alkyl/aryl configuration, such as cadmium p-t-butylbenzoate, calcium benzoate or zinc salicylate, (c) a phenol capable of behaving as an acidic substance to form a stable compound with a metal irrespective of the presence or absence of a suitable solvent, such as barium nonylphenate, (2) an organometallic compound containing a metal selected from the group consisting of aluminum, barium, bismuth, calcium, cadmium, potassium, lithium, magnesium, sodium, lead, antomony, zinc, tin and strontium, such as a dialkyltin mercaptide or a dialkyltin carboxylate, and (3) any sort of organic compounds capable of preventing deterioration of the vinyl chloride resin.

The organic compounds include, for example, α-phenylindole or an aminocrotonic acid ester. These compounds may be used either alone or in the form of a mixture or a solution in a suitable solvent which is not limited to a stabilizer. They are used in the form of a combination of calcium carboxylate/zinc barium phenate/cadmium salt of a branched fatty acid, or barium carboxylate/cadmium/zinc carboxylate.

There is used a substance which improves the effects of the above-mentioned stabilizer when it is used in combination with the stabilizer, though it per se exhibits no stabilizing effect when it is used alone. This substance is called "a costabilizer" and includes the following compounds:

(a) an epoxidized oil such as epoxidized soybean oil, or an ester such as epoxidized octyl oleate, (b) a trialkyl, triaryl or alkylaryl phosphite such as triphenyl phosphite, tris(nonylphenyl) phosphite or diphenylisodecyl phosphite.

(c) a partial ester of pentaerythritol, neopentyl glycol, sorbitol or glycerol, or (d) a phenol compound such as 2,6-di-t-butyl-4-methylphenol or 2,2-(4-hydroxyphenyl)propane.

These co-stabilizers may be used either alone or in the form of a mixture of them. They may be combined with the main stabilizer in any ratio and in any desired combination.

The co-stabilizer may be used alone in its natural form or in the form of a mixture with the stabilizer. The co-stabilizer may also be used in the form of a solution of the same alone or that of a mixture with the stabilizer in a suitable solvent which is not limited to the stabilizer for the vinyl chloride resin.

The plasticizer may be used in the form of a mixture with a lubricant such as polyethylene wax, ester wax, stearic acid, calcium stearate or lead stearate, or a filler such as pulverized or precipitated calcium carbonate or china clay.

The plasticizer may be used together with a substance which absorbs ultraviolet rays to increase the stability of the vinyl chloride resin against light, such as benzophenone or benzotriazole.

The above-mentioned plasticizer may be used also in the form of a mixture with the following, known plasticizer:

(a) a flame-retardant such as a triaryl phosphate or an alkyldiaryl phosphate, (b) a phthalate ester, (c) a plasticizer such as an adipate, sebacate or azelate, (d) a poly(1,3-butylene glycol adipate) terminated with an alcohol having 8 carbon atoms or a conventional polyester plasticizer such as another typical polymer of this type, (e) an aryl ester of an alkanesulfonic acid, or (f) an extender containing a halogenated paraffin or an aromatic hydrocarbon.

When the polyester of the present invention is used as a modifying agent for a polyethylene terephthalate resin, a crystallization temperature of this resin can be lowered to an extent greater than that attained by using an ordinary polyester modifying agent. Further, the polyester of the present invention exhibits excellent compatibility, heat resistance and processability as a modifying agent for the polyethylene terephthalate resin.

The following examples will further illustrate the present invention, which by no means limit the scope of the present invention. In the examples, parts are given by weight.

EXAMPLE 1

249 parts of terephthalic acid, 374.4 parts of neopentyl glycol, 681 parts of ε-caprolactone, 366 parts of benzoic acid and 3.34 parts of a 1% solution of tetrabutyl titanate in heptane were charged in a 2-1 four-necked flask provided with a thermometer, nitrogen-inlet tube, stirrer and condenser and reacted under introduction of nitrogen at 200° to 220° C. for 32 h to obtain 1,550 parts of a lactone polyester having an average molecular weight of 1,000.

| Properties of the lactone polyester: | |
|---|---|
| hue (APHA) | 250 |
| acid value (mg KOH/g): | 0.01 |
| OH value (mg KOH/g): | 5.2 |
| viscosity (cP/25° C.): | 9,100 |

EXAMPLE 2

332 parts of terephthalic acid, 499.2 parts of neopentyl glycol, 508 parts of ε-caprolactone, 488 parts of benzoic acid and 3.65 parts of a 1% solution of tetrabutyl titanate in heptane were charged in the same device as in Example 1 and reacted under introduction of nitrogen at 200° to 220° C. for 30 h to obtain 1,650 parts of a lactone polyester having an average molecular weight of 800.

| Properties of the lactone polyester: | |
|---|---|
| hue (APHA): | 120 |
| acid value (mg KOH/g): | 0.04 |
| OH value (mg KOH/g): | 6.7 |
| viscosity (cP/25° C.): | 13,000 |

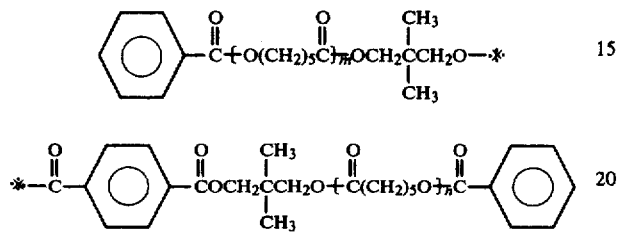

Example 1: m+n=3.98 on average.
Example 2: m+n=2.23 on average.

What is claimed is:

1. A polyester compound represented by the general formula:

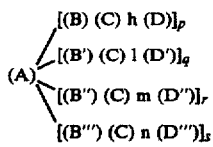

wherein:

(A) is a residue of an aromatic carboxylic acid having 1 to 4 carboxyl groups and 1 or 2 aromatic rings or a residue of an aliphatic carboxylic acid having 1 to 4 carboxyl groups and 4 to 37 carbon atoms, (B), (B'), (B'') and (B''') may be the same or different and each is a residue of a saturated, straight-chain or branched aliphatic diol having 2 to 6 carbon atoms, (C) is a residue of ω-hydroxycaproic acid and h, l, m and n are numbers larger than 0, (D), (D'), (D'') and (D''') may be the same or different and each is a residue of an aromatic monocarboxylic acid having 1 or 2 aromatic rings, the respective residues being bonded with each other through an ester bond and selected so as to give the average molecular weight of 700 to 3,000 by properly adjusting the values of h, l, m and n, and p, q, r and s are each zero or one, the total of them being from one to four.

2. A process for preparing a caprolactone-modified polyester, which comprises of reacting 10 to 90 molar percent of epsilon-caprolactone or omega-hydroxycaproic acid with 90 to 10 molar percent of (b) a hydroxyl component comprising one or more saturated, straight-chain or branched aliphatic diols having 2 to 6 carbon atoms, (c) an aromatic polybasic carboxylic acid component having 1 or 2 aromatic rings or an aliphatic polybasic carboxylic acid component having 4 to 37 carbon atoms and (d) an aromatic monocarboxylic acid having 1 or 2 aromatic rings, said hydroxyl component (b) being used in a stoichiometric amount or up to 20 percent larger amount than said the acid component (c), the obtained product having an average molecular weight of 700 to 3000.

* * * * *